Dec. 20, 1960   A. K. ROEBUCK ET AL   2,965,689
ISOPARAFFIN ALKYLATION PROCESS
Filed Sept. 29, 1958
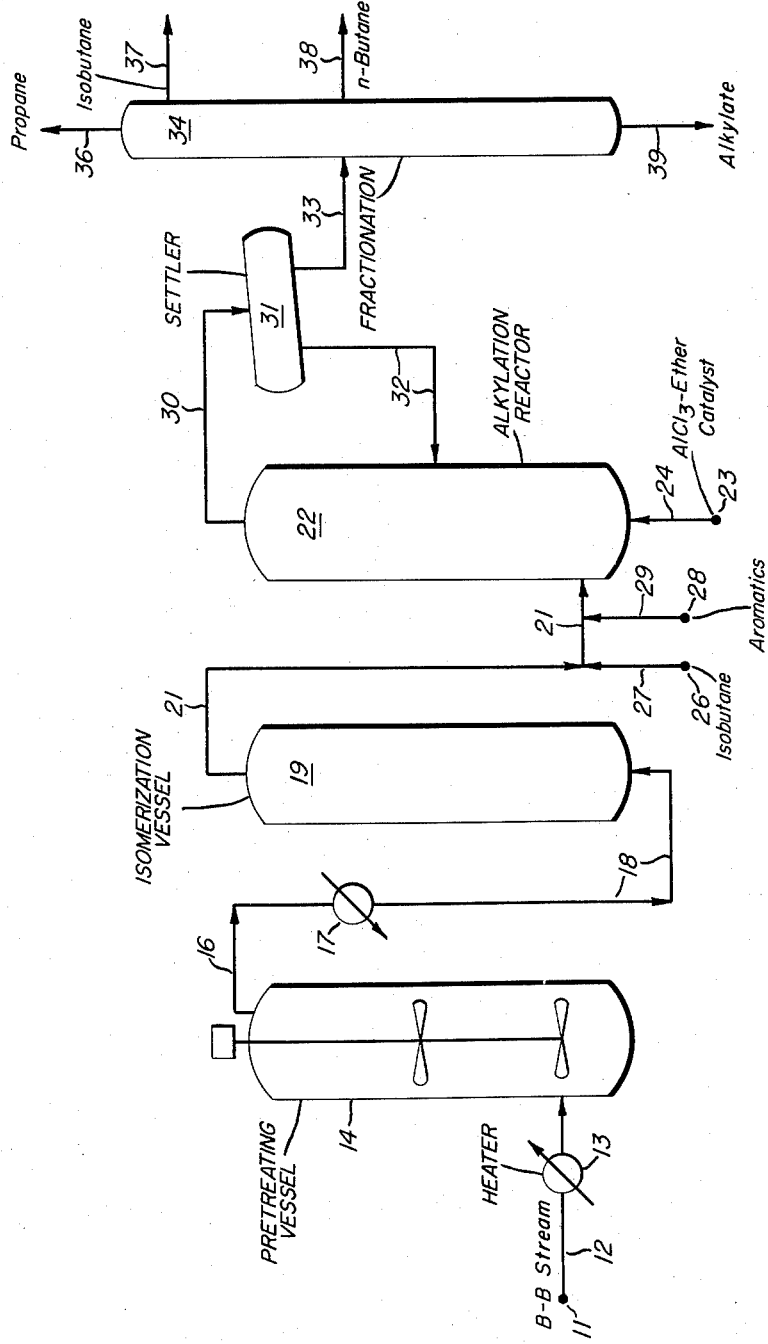
INVENTORS:
Alan K. Roebuck
Bernard L. Evering
BY
Joseph C. Kotarski
ATTORNEY

2,965,689

ISOPARAFFIN ALKYLATION PROCESS

Alan K. Roebuck, Dyer, Ind., and Bernard L. Evering, Chicago, Ill., assignors to Standard Oil Company, Chicago, Ill., a corporation of Indiana Filed Sept. 29, 1958, Ser. No. 764,063

15 Claims. (Cl. 260—683.2)

This invention relates to improvements in the alkylation of isoparaffins with olefins and particularly concerns methods for treating olefins before they are employed in the alkylation process.

The present application is a continuation-in-part of our Serial No. 606,810, filed August 29, 1956, and now abandoned.

One object of this invention is to provide a process for alkylating isoparaffins with olefins and thereby producing alkylate having a very high octane number. Another object is to provide a process in which isomerizable terminal olefins, that are to be employed in the alkylation reaction, are efficiently converted by an improved isomerization process to internal olefins which when alkylated using a particular catalytic system results in alkylate of unexpectedly high octane number. A further object is to provide an improved method for the isomerization of monoolefinic hydrocarbons which employs catalysts having unusually high activity. An additional object is to provide a method for isomerizing olefins at relatively low temperatures and at rapid reaction rates. Another object is to provide a process for isomerizing monoolefinic hydrocarbons which enables the high activity isomerization catalysts to be employed efficiently and for long periods of operating time. These and other objects of the invention will be more fully apparent from the detailed description of the invention provided herein.

The commercial alkylation processes in use today employ sulfuric acid or hydrogen fluoride and produce alkylates having a F-1 clear octane of about 88–95. The unusual commercial unit produces gasoline boiling range alkylate averaging 93–94 F-1 clear. Near the upper limit of the octane number scale, i.e. 95–100, an apparently very minor increase of one to two units represents a greater increase in the performance of the fuel than these same number of units represent at a lower point in the octane scale. For example, 99–100 F-1 clear isobutane-butylene alkylate has a power output of close to 20% greater than does the 94 F-1 clear alkylate produced by present day commercial processes. This is evident from "Aviation Gasoline Manufacture" by Van Winkle, Figure 2-IX, page 238, McGraw-Hill (1944). The great importance of producing alkylate having an octane number of about 99–100 F-1 clear or higher is thus quite apparent.

One aspect of the present invention concerns the production of an isoparaffin-olefin alkylate by contacting a hydrocarbon stream containing terminal olefins, generally having from 4 to 8 carbon atoms, with a supported alkali metal catalyst to cause isomerization of terminal olefins to internal olefins; the isomerized olefins are then contacted with an isoparaffin in an alkylation reaction catalyzed by using an aluminum chloride-ether catalyst which contains in excess of one mol of aluminum chloride per mol of a low molecular weight ether containing no more than about four carbon atoms per ether molecule.

Another aspect of the invention concerns the low temperature isomerization of isomerizable monoolefinic hydrocarbons using as a catalyst alkali metal carried on a high surface area support. The highly active isomerization catalyst is prepared by mixing an alkali metal while in the molten state e.g. sodium, potassium, lithium, with a supporting material of high surface area such as activated alumina, charcoal, silica and similar materials. It is employed to catalyze olefin isomerization at temperatures below about 100° F., such as ambient temperatures of 50–75° F. Isomerization to essentially the equilibrium compositions can be attained at very low temperature and at rapid rates due to the high catalyst activity. The life of the isomerization catalyst may be increased by pretreating the charge stocks to the isomerization step to remove impurities therefrom which deactivate the isomerization catalyst. The pretreating step, which removes impurities reactive with alkali metal, can be effected by first contacting the impure olefin stream with molten alkali metal. Some isomerization of the olefins can be effected in this pretreating step. Thereafter the pretreated (and partially isomerized, if desired) olefins are contacted with the supported alkali metal catalyst at temperatures below 100° F. to isomerize the olefins.

One embodiment of the present invention is shown in a simplified diagrammatic form in the attached figure. This embodiment illustrates a process for preparing 99–100 F-1 clear octane alkylate by isobutane-butene alkylation. A liquified mixture of butanes and butenes (hereinafter referred to as a refinery B—B stream) recovered from the products of catalytic and/or thermal cracking of gas oils or other refinery operations is employed as a charge stock in this embodiment. The composition of the refinery B—B stream may vary considerably, depending upon the producing sources. A typical stream contains about 40% isobutane, 10% n-butane, 20% isobutene, 10–15% butene-1 and 15–20% butene-2. The B—B stream, which is washed with caustic solution to remove substantial amounts of $H_2S$, sulfur compounds and the like and is thereafter dried (by means not shown herein), is passed from source 11 by way of line 12 to heater 13 wherein its temperature is raised to about 210–225° F. The heated B—B stream is then passed into stirred vessel 14 which contains molten sodium at a temperature of about 210–225° F. Other molten alkali metals such as potassium, lithium, or alloys of various alkali metals may be used in place of the molten sodium but the latter is preferred since cheaper. While temperatures of 300–600° F. may be used, it is preferred to employ temperatures below about 300° F. and preferably not higher than about 230–285° F. since that is the critical temperature of isobutane. The B—B stream is pretreated in vessel 14 to remove impurities such as water, sulfur compounds, oxygen and oxygenated compounds, butadiene, carbon monoxide, carbon dioxide, acetylene and other materials which are present in very small amounts in the B—B stream and which would cause rapid deactivation of the highly active supported alkali metal catalyst employed in a later step for isomerization. During the course of the pretreating in vessel 14, tars may be formed on the molten sodium. As the tars form upon the molten sodium, a portion of the tarry-sodium material may be removed from the bottom of vessel 14 and discarded, and fresh molten sodium may be introduced near the top of vessel 14.

The B—B stream can be contacted with the molten sodium so as to effect partial i.e. up to 50% or more, isomerization of butene-1 to butene-2. Isomerization reaction times of from 5 minutes to 10 hours e.g. 3 hours, may be used. In the embodiment shown herein, the principal purpose for employing the molten sodium contacting step is to pretreat the olefin charge stock and remove impurities that would deactivate active isomerization catalyst employed in the second step, but at the same time approximately 10–25% of the butene-1 is isomerized to butene-2. In this manner the pretreating material i.e. molten sodium, serves a double purpose. Other materials which remove impurities from the olefin stream that are reactive with sodium (or other alkali metals) can be used in place of the molten sodium employed in the pretreating step. For example, charcoal, Drierite, Ascarite, 5A Molecular Sieves, alumina, silica gel, etc. can be employed.

The pretreated B—B stream is removed from vessel 14 by way of line 16 (entrained molten sodium being separated from the hydrocarbons and returned to vessel 14) and passed into cooler 17. The temperature of the B—B stream is therein reduced to ambient temperatures e.g. 30–100° F. (usually about 50–70° F.). The cooled B—B stream is then passed by way of line 18 into isomerization vessel 19 which contains a bed of the very active supported alkali metal catalyst. The isomerization catalyst is sodium deposited upon high surface activated alumina. The catalyst may contain 2–20% by weight of sodium e.g. 5%. It is prepared by thoroughly mixing dried alumina granules with molten sodium in a medium that is nonreactive with sodium e.g. helium, nitrogen, or other inert gas, at a temperature of about 100–500° C. Additional details as to the preparation of such catalysts will be given subsequently.

The pretreated B—B stream contacts the supported sodium catalyst at ambient temperatures of 50–70° F. The B—B stream may be in the liquid or vapor state, although in this embodiment wherein the B—B stream is subsequently employed in alkylation it is more convenient to contact the B—B stream in the liquid state with the isomerization catalyst. Pressures sufficient to maintain the B—B stream in the liquid state are therefore employed. Because of the extremely high activity of the catalyst a wide variation of temperature and space velocity may be used while obtaining compositions approaching the equilibrium at a particular temperature employed. The choice of space velocity, which can be varied from 0.1 to 100 lbs. of butene per hour per lb. of catalyst and even higher, will depend considerably upon the economic factors involving catalyst life, labor costs replacing the batch of catalyst, the size of the isomerization reactor, etc. A plurality of isomerization reactors may be used. The reactors can be used in parallel flow or in series flow. When the catalyst loses activity for isomerization it can be used as a pretreating vessel (as a substitute for vessel 14 and the function which the latter vessel performs) and the pretreated B—B stream subsequently being passed to a second vessel which contains fresh supported sodium catalyst. The B—B stream removed from isomerization reactor 19 by way of line 21 contains less than about 1% of butene-1.

It is very important that the butene-1 be isomerized at low temperatures and with the catalyst employed in isomerization reactor 19. The reason is that when isobutane is alkylated with butene-1 while employing the alkylation process to be described hereinafter, an alkylate having an F–1 clear octane number of about 66 is obtained. But when butene-2 is used the F–1 clear octane number of the alkylate is approximately 99–101. Since the chemical equilibrium favors higher concentrations of butene-2 and lower concentrations of butene-1 at lower temperatures, it is important to employ a process which isomerizes butene-1 to butene-2 at low temperatures in order to take advantage of the favorable chemical equilibrium at low temperatures and thereby obtain highest concentrations of butene-2 and lowest concentrations of butene-1 in the isomerization products which are then alkylated to yield alkylate of maximized octane number. The prior art e.g. U.S. 2,804,489, U.S. 2,740,820 does not provide an olefin isomerization process which is operable at low temperatures to produce excellent yields at rapid rates.

After removal of the isomerized B—B stream from isomerization reactor 19, this stream is washed (to remove any traces of occluded alkali metal) and then dried by means not shown herein. The dried B—B stream is then passed by way of line 21 into an alkylation reactor, depicted here as vessel 22. An aluminum chloride-ether catalyst is passed from source 23 by way of line 24 into the alkylation reactor 22. This catalyst is liquid in form and contains more than one mol of aluminum chloride per mol of a low molecular weight ether having no more than 4–6 carbons atoms. It may contain as much as two or more mols of aluminum chloride per mol of ether, but generally contains between 1.01 and 1.5 mols of aluminum chloride per mol of ether e.g. a molar ratio of $AlCl_3$/ether of 1.05 to 1.2:1. The ether may be one such as dimethylether, diethylether, methylethylether, or mixtures of such ethers (propyl ethers are not as satisfactory). The alkylation catalyst may be made by mixing aluminum chloride (preferably of high purity) with the ether at a temperature below 180–200° F. e.g. temperatures of 70–130° F. are satisfactory. The liquid catalyst (catalyst made from dimethylether or diethylether alone tend to solidify at temperatures of 70–80° F. and the use of mixtures of dimethylether and diethylether solidify at much lower temperatures on the order of 20–30° F.) is preferably fully saturated with respect to aluminum chloride so that a minor amount of solid aluminum chloride particles remain suspended therein when the liquid catalyst is at a temperature of 50–75° F. Fresh and recycled isobutane from source 26 is passed by way of line 27 into line 21. A small amount of aromatic hydrocarbon is introduced from source 28 by way of line 29 into line 21. The aromatic hydrocarbon is usually employed in the amount between 0.001 and 2% by weight based upon the aliphatic hydrocarbons (paraffins and olefins) charged to the alkylation reactor. Its presence enables the aluminum chloride-ether catalyst to produce alkylate having an F–1 clear octane number of 99–100 when alkylating the isomerized B—B stream. In its absence, the octane number would be lower by at least 4–6 numbers. Aromatic hydrocarbons such as benzene, substituted benzenes containing from 1 to 6 alkyl substituents which may have from 1 to 4 or more carbon atoms each may be employed. Styrene, indane, indene, and various other aromatics, mixtures of aromatics such as fractions of hydroformate, etc. may be used. In general, the greater the number of alkyl side chains in the aromatic hydrocarbon, the less is the amount of the aromatic hydrocarbon which is needed. Expressing the amount of aromatic hydrocarbon employed in another fashion, it may vary between 1 and 50% based upon catalyst. It is preferred to add aromatic hydrocarbon to the alkylation zone after the alkylation reaction has been started.

The B—B stream, added isobutane, minor amount of aromatic hydrocarbon, and aluminum chloride-ether catalyst are intimately contacted in alkylation reactor 22 where upon the isobutane is alkylated with the butenes. Alkylation temperatures at which the catalyst is liquid are employed. Temperatures should be below about 150–200° F. and will generally be in the range of 30–100° F. e.g. 70° F. A pressure sufficient to maintain the reactants in the liquid phase e.g. 50 to 1000 p.s.i.g., is used. Liquid volumetric ratios of hydrocarbon reactants to catalyst of 1:1 to 100:1 e.g. 10 to 20:1 are satisfactory. An external isoparaffin/olefin ratio of 2:1 to 50:1 and internal ratios of 10:1 to 1000:1, such as are used in commercial alkylation processes, may be employed. Residence times of from 1 minute to more than 2 hours, depending upon the reactor, hydrocarbon/catalyst ratios and desired results, may be used. Any of a variety of the alkylation reactor systems such as the jet type, time-tank system, Stratco, cascade type, etc. can be used. An effluent is removed from alkylation reactor 22 and passed by way of line 30 into settler 31. A lower catalyst layer is removed from the settler and returned to the alkylation reactor by way of line 32. An upper hydrocarbon layer is removed from settler 31 and passed by way of line 33 into a fractionation train, represented here by column 34. In the fractionation train, propane and lighter gases can be removed from the system by way of line 36, isobutane can be removed by way of line 37 and recycled to the alkylation reactor, and n-butane can be removed from the system by way of line 38. Gasoline boiling range alkylate having an octane number of 99–100 F–1 clear can be removed from the fractionation train by way of line 39, further purified if desired, and employed for blending purposes.

While the embodiment described hereinabove related to the isomerization of a butene-1 containing fraction followed by alkylation of isobutane with the isomerized butenes, terminal olefins having from 5 to 8 carbon atoms may be similarly isomerized and used in the alkylation of isoparaffins having from 5 to 8 carbon atoms.

The supported alkali metal olefin isomerization catalyst can be used in the isomerization of any isomerizable monoolefinic hydrocarbon to its position isomer. By position isomer is meant the isomeric organic compounds which have the same carbon skeleton but differ with respect to the position of the double bond (i.e. olefinic linkage). Suitable charging stocks are those monoolefinic hydrocarbons which have at least one position isomer, particularly terminal alkenes having the general formula

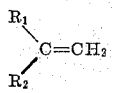

wherein $R_1$ is an alkyl radical containing at least two carbon atoms and ranging up to twenty carbon atoms or more, and $R_2$ is an alkyl radical containing at least one carbon atom or is a hydrogen atom. Examples of suitable alkenes include 1-butene, 2-butene, 1-pentene, 1-hexene, 2-hexene, 1-heptene, 1-octene, 1-dodecene, 1-tetradecene, 1-hexadecene, 2-pentene, 2-heptene, 3-heptene, 2-methyl-1-butene, 2,3-dimethyl-1-butene, 2,2,4-trimethyl-2-pentene, 2,3,4-trimethyl-1-pentene and the like.

The process of the present invention can also be applied to position-isomerizable cycloalkenes in which a ring carbon atom, especially one which is not doubly bound to another ring carbon atom, is bound to a saturated monovalent hydrocarbon radical. Thus the feed stock can comprise alkylcycloalkenes, such as alkylcyclobutenes, alkylcyclopentenes and alkylcyclohexenes. A particularly desirable application of the process may be made to non-tertiary alkylcycloalkenes. The non-tertiary alkylcycloalkenes are cycloalkenes in which at least one of the ring carbon atoms, which is not linked to another ring carbon atom by a double bond, is linked to an alkyl group, e.g., methyl, ethyl, isopropyl, t-butyl, etc. Specific examples of suitable alkylcycloalkene charging stocks include 3-methylcyclobutene, 4-methylcyclopentene, 4-ethylcyclopentene, 4-isopropylcyclopentene, 3-tertiary butylcyclopentene, 3-methylcyclohexene, 4-ethylcyclohexene, 3-isopropylcyclohexene, 4-tertiary butylcyclohexene, 3,5-dimethylcyclohexene, 3,4-dimethylcyclohexene, 3,5-diethylcyclohexene, 3-methyl-4-isopropylcyclohexene and the like.

The process of the present invention can also be applied to other isomerizable hydrocarbon derivatives of aliphatic and cycloaliphatic monoolefins. In addition to the alkyl derivatives of aliphatic monoolefins, there may be employed the isomerizable cycloparaffin and aryl derivatives of the aliphatic monoolefins. Likewise the cycloparaffin or aromatic derivatives of cycloalkenes which are isomerizable may also be used as charging stocks. Examples of additional charging stocks include 4-cyclohexylcyclohexene, 3-cyclohexylcyclohexene, 4-cyclopentylcyclohexene, 3-cyclopentylcyclohexene, 4(cyclohexylmethyl)cyclohexene and the like.

In some instances, the isomerization of alkenes by the process of the present invention, tends to shift the double bond from the outer portion of the chain towards the center of the molecule. Thus, 1-heptene isomerizes, apparently successively, to 2-heptene and 3-heptene. However in other cases, an equilibrium mixture which is richer in 1-olefins than in olefins with internal double bonds is produced. The isomerization of cycloalkenes tends to produce tertiary cycloalkenes, e.g., 1-alkylcyclohexenes from 3- or 4-alkylcyclohexenes.

While a principal utility of the process of this invention is for effecting position isomerization of the monoolefinic hydrocarbons, it is also of general utility for effecting cis-trans isomerization of various monoolefinic charging stocks. It is frequently advantageous to change the position of the double bond of hydrocarbon components of gasoline. For example, the clear F–1 octane numbers for heptene-1, trans-heptene-2 and trans-heptene-3 are about 50, 73 and 90 respectively. Thus by isomerizing heptene-1 to heptene-2 and heptene-3, a large increase in octane rating is achieved. A dilute olefin stream may be used as the charge stock to the isomerization process. As shown in the illustrated embodiment, petroleum streams containing monoolefinic hydrocarbons may be used as charge stocks to the isomerization process.

Because of the extremely high activity of the isomerization catalyst, it may be used to effect isomerization of monoolefinic hydrocarbons at temperatures of around 100° F. down to as low as −100° F. The unique ability of the present catalysts to cause rapid isomerization at such low temperatures is truly surprising inasmuch as finely divided sodium particles (20–50 microns, which should have high catalytic activity in view of the large surface area it presents) effects no isomerization at temperatures of 200–250° F. but requires the severe conditions of a temperature of 435° F. and the use of promoters for the catalyst according to U.S. 2,740,820 in order to effect isomerization of the monoolefins. In the present invention, isomerization temperatures of from −100° F. to 100° F. may be used. Ambient temperatures of 0° to 100° F., e.g. temperatures of 50–75° F. may be preferred from the standpoint of convenience and economy. In addition to the more desirable chemical equilibrium compositions that exist at lower temperatures, another advantage of using the supported alkali metal isomerization catalyst at temperatures of about 100° F. and below is that the catalyst may be employed for a longer period of time than if higher isomerization temperatures are used. Apparently, a very small amount of polymer is formed at the higher temperatures which tends to deactivate the catalyst more rapidly. The isomerization of the monoolefinic hydrocarbon may be carried out in the liquid or vapor state or in a mixed phase operation. Superatmospheric pressures are not required (although pressures up to about 200–400 p.s.i.g. may be employed to maintain lower boiling isomerizable olefins in the liquid state). The contact time between the monoolefin and the catalyst will depend upon the extent of isomerization desired, the temperature, and the particular catalyst and amount thereof used. Weight hourly space velocities of 0.1 to 100 or higher can be used in flow operations. In continuous flow operations using sodium supported on activated alumina, the composition of the initial isomerization products approaches the theoretical equilibrium when temperatures as low as −60° F. at weight hourly space velocities as high as 40 are used, due to the extreme activity of the catalyst. Lower space velocities are used when sodium on charcoal is employed since the latter catalyst is less active. If isomerization only part way to the theoretical equilibrium is desired, even faster space velocities may be used. It may be desirable in certain instances e.g. for economic or other reasons, to employ lower space velocities on the order of 0.1 to 10. In batch operations or semi-continuous operations (wherein the reaction period is expressed in terms of contact time) contact times which are the substantial equivalent of those prescribed hereinabove for continuous operation may be used.

The isomerization catalyst employed is an alkali metal extended upon a support of high surface area. Alkali metals such as sodium, potassium, lithium, etc. or mixtures thereof are contacted while in the molten state with the high surface area supporting material, usually with agitation, so as to deposit alkali metal upon the support. The contacting of the molten alkali metal and supporting material is carried out in an inert atmosphere. An inert gas blanket such as a group zero gas e.g. helium, argon, neon, krypton, or nitrogen, or an inert liquid may be used to provide the inert atmosphere. By inert atmosphere is meant an atmosphere or medium which does not react with sodium to transform the sodium into a derivative which has no catalytic activity for isomerization. The high surface area support material and alkali metal are contacted in the inert atmosphere at temperatures of about 300–1000° F., e.g. 700° F. until the alkali metal appears evenly distributed and coated upon the supporting material, even distribution ordinarily being effected over the course of 10 minutes to 2 hours depending upon the efficiency of contacting. This catalyst preparation technique may be followed when potassium or lithium metals are employed, but sufficiently high temperatures must be used to insure that the alkali metal is molten. When employing lithium metal, nitrogen does not function as an inert atmosphere since it forms lithium nitrides to an undesirable extent.

A supporting material of high surface area is used in preparing the catalyst. The supporting material should preferably be dried to free it of water e.g. by subjecting it to drying temperatures of 300–1200° F. for 0.1 to 100 hours. Supporting materials having from about 5–10 to 2000 square meters of surface area per gram (according to the Brunauer, Emmet, Teller Technique described in Jour. Amer. Chem. Soc., vol. 60 (Feb. 1938), page 309) may be used. Examples of supporting materials are activated alumina such as gamma alumina and the various forms thereof, activated carbons such as activated charcoal, silica gel, titania, zirconia, magnesia, synthetic silica-alumina and silica-magnesia composites which also may contain other ingredients, activated bauxite, clays, pumice, kieselguhr, Molecular Sieves, etc. Such supporting materials, as well as others in addition to those listed hereinabove, may be used although not with necessarily the same effect. The supporting material is preferably employed in a divided form such as granules or powder. The supported alkali metal catalyst may contain between about 1 and 50% by weight of the alkali metal. Optimum amounts of alkali metal to employ will vary to some extent depending upon the particular supporting material and the particular alkali metal used, usually being approximately that amount necessary to form a monomolecular layer of alkali metal on the support. For example, sodium on activated alumina catalyst (which is a preferred catalyst because it has long life and higher activity than other supported alkali metal catalysts) will usually contain from 2 to 10% by weight of sodium. Activated alumina usually has a surface area of 50 to 1000 e.g. 250 square meters per gram, whereas activated charcoal usually has a higher surface area e.g. 500 to 2000 square meters per gram (BET). Thus when a catalyst is prepared using activated charcoal as the supporting material it optimally contains larger amounts e.g. 10 to 30% by weight of sodium.

Although it is sometimes less active than the supported alkali metal catalyst, the hydride form of the alkali metal may be used to good advantage. Thus a portion or all of the alkali metal may be present as alkali metal hydrides upon the high surface area supporting material. The hydride form may be prepared prior to deposition upon the supporting material, or the supported alkali metal can be converted in part or totally to the corresponding hydride by contacting the supported alkali metal at a temperature of 100–600° F. under a hydrogen pressure of 15–1500 p.s.i. or more.

Precautions should of course be observed during the manufacture, transferring, and use of the catalyst so as to maintain it in an inert atmosphere i.e. exclude reactive materials such as air, moisture, etc., from contact with the alkali metal.

A number of experiments were carried out which demonstrate the high activity of the supported alkali metal isomerization catalysts for isomerizing various monoolefinic hydrocarbons. In the following experiments a catalyst of sodium supported on activated alumina containing 4% by weight of sodium was employed. The activated alumina used in preparing the catalyst was Alcoa F–1 alumina (48 to 100 mesh and having an average surface area of 225 square meters per gram according to the BET method). The alumina granules were placed in a tube and then heated while flowing nitrogen through the tube. The tube was heated to about 950° F. and the drying of the alumina was carried out for about 6 hours at such temperature. Thereafter the partially cooled alumina was transferred (while in a nitrogen atmosphere) into a three necked flask equipped with a stirrer; nitrogen being passed through the flask before, during, and after the introduction of the alumina granules thereinto. The stirrer was started. The flask was kept at a temperature of about 750° F. Pea-sized pieces of sodium (which had been cut under hydrocarbon oil) were added to the flask, the oil evaporating and being carried out with the nitrogen purge gas as the pieces were added. The contents of the flask were stirred at about 750° F. for 30 minutes. Purge gas flow and stirring were continued thereafter while the catalyst was cooled to room temperature. Thereafter a portion of the catalyst was transferred (in a nitrogen atmosphere) into an up flow tubular glass isomerization reactor (the reactor and associated lines had been flushed with nitrogen before addition of the catalyst). Olefin charge stock was then introduced into the bottom of the reactor, removed from the top of the reactor, and passed then into a receiver. Samples were withdrawn from the receiver periodically and were analyzed by gas chromatography or infrared to determine the composition of the products. A number of runs were carried out using different olefins in each run and a fresh portion of the catalyst in each run. The composition of the products shown in the following table are those for samples withdrawn after approximately 20 cc. of feed per gram of catalyst had been passed through the reactor. The results obtained were as follows:

*Table I*

| Charge Olefin | Temp., °F. | WHSV | Press., p.s.i.g. | Products |
| --- | --- | --- | --- | --- |
| butene-1 | 75 | 1.4 | 75 | 76% trans-butene-2. 21% cis-butene-2. |
| pentene-1 | 75 | 0.7 | 10 | 79% trans-pentene-2. 19% cis-pentene-2. |
| hexene-1 | 75 | 1.2 | 0 | 97% trans-hexene-2. 2-3% cis-hexene-2. |
| 4-methylcyclohexene-1 | 75 | 2.3 | 0 | 40% 1-isomer. 15% 3-isomer. 45% 4-isomer. |
| octene-1 | 75 | 2.3 | 0 | 95% trans-octenes.[1] 4-5% cis-octenes.[1] |

[1] Internal olefins.

In another experiment, butene-1 was isomerized to butene-2 employing sodium supported on activated charcoal as the isomerization catalyst. Except where otherwise indicated, the catalyst was prepared by the technique used in preparing catalyst for the preceding runs. 30 grams of dried 8–14 mesh Columbia activated coconut charcoal (having a surface area of about 1400 square meters/gram) was added to the helium-purged preparation flask containing the stirrer. (Helium was used as the inert gas instead of nitrogen.) The flask was heated to about 400° F. and the contents stirred. Six grams of freshly cut pea size sodium were added piece by piece to the flask. The contents of the flask were stirred for 45 minutes and then cooled to room temperature after which the purge gas was stopped and the flask was stoppered. 20.1 grams of catalyst were then added to the up-flow isomerization reactor. Mathieson CP butene-1, which had been passed through a pretreating zone containing Ascarite (for the removal of $CO_2$ and $H_2S$) and Drierite (for the removal of $H_2O$) was then introduced into the bottom of the reactor. The isomerization was carried out at a temperature of about 75° F., a pressure of 74 p.s.i.g., and a weight hourly space velocity of 0.45. As various indicated increments of the feed stock were passed through the reactor and into the receiver, they were withdrawn from the receiver and analyzed by gas chromatography to determine the butene-2 content thereof. Table II which follows shows the results which were obtained.

Table II

| cc. Feed/gm. Catalyst | Percent Butene-2 in Product | Percent of Equilibrium Attained |
| --- | --- | --- |
| 3 | 96.8 | 100 |
| 6 | 96.4 | 99.7 |
| 8.8 | 92.9 | 96.0 |

The ability of the catalyst to isomerize olefins to the theoretical equilibrium at low temperatures demonstrates its high activity.

A batch isomerization experiment employing sodium on activated charcoal (16.7% by weight of sodium) for isomerizing a refinery B—B stream containing butene-1 was carried out in another experiment. The catalyst was prepared by placing 30 grams of 6–12 mesh Columbia activated coconut charcoal (having an average surface area of approximately 1400 square meters/gm., BET method) in a three neck catalyst preparation flask. A continuous flow of helium gas into and out of the flask was initiated and employed throughout the duration of the catalyst preparation. The charcoal was heated to about 570° F. in the course of about one hour. 6 grams of freshly cut pea-size pieces of sodium were removed from an iso-octane covering liquid and added piece by piece to the flask, the iso-octane coating on the sodium being evaporated and carried out of the flask with the helium purge gas. The sodium and charcoal were stirred for 1½ hours at 570° F. The catalyst was then cooled to room temperature and thereafter transferred to a rocking bomb which contained a nitrogen gas atmosphere. 54 grams of a refinery B—B stream was added to the rocking bomb. The bomb was held at an isomerization reaction temperature of 70–80° F. Samples were periodically withdrawn from the bomb and analyzed by gas chromatography for the various constituents in the product. The composition of the charge and the isomerization products at various intervals of time is shown in Table III which follows:

Since the supported alkali metal catalysts were found to have such high activity at room temperatures for the isomerization of olefins, runs were carried out at very low temperatures and at high space velocities so that a more accurate measure of the activity of the catalyst could be made. The catalyst was prepared by calcining 35.5 grams of Alcoa F-1 activated alumina (48–100 mesh and having an average surface area of 225 square meters/gram BET method) in a calcination or drying tube wherein the alumina was dried for 6 hours at 950° F. while flowing nitrogen through the tube. After cooling the alumina somewhat, it was transferred to a threenecked flask and maintained therein at a temperature of about 750° F. while flowing nitrogen gas through the flask. 1.45 grams of pea size sodium (which had been kept under isooctane) was added piece by piece to the flask. The sodium and alumina were stirred at about 750° F. for 45 minutes and then cooled to room temperature. 5.26 grams of the catalyst (which contained 4% by weight of sodium) was charged to the up flow reactor. Mathieson CP butene-1 was pretreated by passage through consecutive zones of Drierite, Ascarite, 5A Molecular Sieves and then introduced into the bottom of the continuous up flow reactor. After passage through the reactor, the product was passed into the receiver until a predetermined amount of butene-1 had been passed through the reactor. At that time the contents of the receiver were removed and analyzed. The space velocity was then reduced from 82.1 to 41.0 and the run continued. After analyzing the contents of the receiver an additional amount of feed was processed at a space velocity of 13.7. The weight hourly space velocity, average reaction temperature, and percentage of butene-2 in the products are shown in Table IV which follows:

Table IV

| WHSV | Average Temp., °F. | Percent Butene-2 in Product |
| --- | --- | --- |
| 82.1 | −65 | 49.4 |
| 41.0 | −58 | 80.0 |
| 13.7 | −80 | 85.6 |

Since the same catalyst was employed throughout the run and was gradually declining in activity, the percentage of butene-2 measured in the products reflect average conversions through the course of the run. Extrapolation of data from additional samples which were taken during the course of the run indicates that the initial conversions with fresh catalyst would be 54% at WHSV of 82.1, and 100% at the WHSV of 41.0 and 13.7. This demonstrates the phenomenal activity of the catalyst.

While the invention has been described with respect to certain illustrated embodiments and data employing particular catalysts and olefins, it is not necessarily limited thereto but includes others as would be obvious herefrom to those skilled in the art.

We claim:
1. A process for producing an isoparaffin-olefin alkylate

Table III

[Compositions]

| | Of Feed | After 5 min. | After 15 min. | After 30 min. | After 1 hr. | After 4 hrs. | After 7 hrs. | After 70 hrs. |
| --- | --- | --- | --- | --- | --- | --- | --- | --- |
| Propane | 0.9 | 1.4 | 0.9 | 1.1 | 0.9 | 0.7 | 1.2 | 1.1 |
| Isobutane | 35.4 | 40.1 | 41.0 | 42.1 | 42.8 | 46.0 | 40.8 | 44.4 |
| n-Butane | 9.9 | 10.6 | 10.7 | 10.5 | 11.1 | 10.9 | 10.8 | 10.8 |
| Butene-1 | 10.8 | 3.1 | 2.9 | 0.6 | 0.5 | 0.4 | 0.5 | 0.5 |
| Isobutene | 25.0 | 21.7 | 21.9 | 21.6 | 21.2 | 19.8 | 20.7 | 18.3 |
| t-2-Butene | 11.2 | 13.0 | 13.1 | 14.8 | 15.9 | 17.0 | 19.6 | 19.2 |
| c-2-Butene | 6.8 | 10.1 | 9.5 | 9.3 | 7.6 | 5.2 | 6.4 | 5.7 |
| | 100.0 | 100.0 | 100.0 | 100.0 | 100.0 | 100.0 | 100.0 | 100.0 | which comprises contacting a terminal olefin having from 4 to 8 carbon atoms with a supported alkali metal catalyst in an isomerization zone under conditions for isomerizing terminal olefins to internal olefins comprising the use of temperatures below about 100° F., said supported alkali metal catalyst being prepared by a process comprising intimately mixing molten alkali metal with a supporting material of high surface area, removing isomerized olefins from the isomerization zone, contacting an isoparaffin with the isomerized olefins in an alkylation zone under alkylation reaction conditions while using an aluminum chloride-ether catalyst containing in excess of one mol of aluminum chloride per mol of a low molecular weight ether having no more than about 4 carbon atoms per molecule, removing alkylation reaction products from the alkylation zone and recovering an isoparaffin-olefin alkylate therefrom.

2. The process of claim 1 in which a hydrocarbon mixture containing butene-1 is charged to the isomerization zone wherein butene-1 is isomerized to butene-2 and is thereafter employed in alkylating isobutane.

3. The process of claim 1 in which the supported alkali metal catalyst is prepared by a process comprising intimately mixing molten sodium with activated alumina of high surface area.

4. A process for producing gasoline boiling range alkylate which comprises contacting a refinery gas stream containing butene-1 in a first isomerization stage with a molten alkali metal to effect partial isomerization of butene-1 to butene-2 and remove materials from the refinery gas stream which are deleterious to the catalyst employed in the second isomerization stage, separating the partially isomerized refinery gas stream from the molten alkali metal used in the first isomerization stage and passing said partially isomerized refinery gas stream into a second isomerization stage wherein the refinery gas stream is contacted under conditions to effect additional isomerization of butene-1 to butene-2 comprising the use of a temperature below about 100° F. while employing a supported alkali metal catalyst which has been prepared by a process comprising intimately mixing molten alkali metal with a supporting material of high surface area, separating the isomerized refinery gas stream from the supported alkali metal catalyst used in the second isomerization stage, passing the isomerized refinery gas stream into an alkylation zone and therein contacting it with isobutane under alkylation conditions comprising the use of an aluminum chloride-ether catalyst containing in excess of one mol of aluminum chloride per mol of a low molecular weight ether having no more than about 4 carbon atoms, withdrawing hydrocarbon alkylation products from the alkylation zone and separating therefrom gasoline boiling range alkylate.

5. The process of claim 4 wherein the catalyst employed in the second isomerization stage is prepared by a process comprising mixing molten sodium with activated alumina of high surface area, the isomerized refinery gas stream from the second isomerization stage contains less than about 1% butene-1, and this latter stream is used to alkylate isobutane.

6. The process of claim 4 wherein the catalyst employed in the second isomerization stage is prepared by a process comprising mixing molten sodium with high surface area charcoal, the isomerized refinery gas stream from the second isomerization stage contains less than about 1% butene-1, and this latter stream is used to alkylate isobutane.

7. An olefin isomerization process which comprises contacting an isomerizable monoolefinic hydrocarbon with supported alkali metal, said supported alkali metal being prepared by intimately mixing molten alkali metal with a supporting material of high surface area, said contacting of the monoolefinic hydrocarbon and supported alkali metal being carried out under isomerizing conditions comprising a temperature below about 100° F.

8. The process of claim 7 in which the monoolefinic hydrocarbon contains the unsaturated attached to a terminal carbon atom.

9. The process of claim 7 in which the monoolefinic hydrocarbon is an alkylcycloalkene.

10. The process of claim 7 in which the monoolefinic hydrocarbon is butene-1.

11. The process of claim 7 in which the supported alkali metal is prepared by intimately mixing molten sodium with activated alumina of high surface area.

12. The process of claim 7 in which the supported alkali metal is prepared by intimately mixing molten sodium with charcoal of high surface area.

13. The process of claim 7 in which the charge to the isomerization step is pretreated to remove impurities therefrom which deactivate the supported alkali metal catalyst.

14. A butene isomerization process which comprises subjecting a mixture of butene-1 and butene-2, that has been substantially freed of impurities which are reactive with sodium, to contact with a supported alkali metal catalyst under conditions for converting butene-1 to butene-2 comprising a temperature below about 100° F., said catalyst being prepared by intimately mixing molten alkali metal with a supporting material of high surface area.

15. The process of claim 13 wherein the alkali metal is sodium and the supporting material is high surface area alumina.

References Cited in the file of this patent

UNITED STATES PATENTS

| | | |
|---|---|---|
| 2,361,612 | Drennan | Oct. 31, 1944 |
| 2,368,653 | Francis | Feb. 6, 1945 |
| 2,804,489 | Pines et al. | Aug. 27, 1957 |
| 2,818,350 | Kavanagh | Dec. 31, 1957 |

OTHER REFERENCES

"High Surface Sodium on Inert Solids," U.S. Industrial Chemicals Co., 120 Broadway, New York 5, N.Y. (1953), pages 6–8 and 13.